(12) United States Patent
Kauffman et al.

(10) Patent No.: US 10,556,720 B2
(45) Date of Patent: Feb. 11, 2020

(54) FOLDABLE PALLET DECK

(71) Applicant: Ancra International LLC, Azusa, CA (US)

(72) Inventors: Gregory A. Kauffman, Cincinnati, OH (US); Matthew A. Wolery, Maineville, OH (US); Jerome T. Jones, Independence, KY (US); Robert J. Williams, West Chester, OH (US)

(73) Assignee: Ancra International LLC, Azusa, CA (US)

( * ) Notice: Subject to any disclaimer, the term of this patent is extended or adjusted under 35 U.S.C. 154(b) by 0 days.

(21) Appl. No.: 16/227,079

(22) Filed: Dec. 20, 2018

(65) Prior Publication Data

US 2019/0210764 A1 Jul. 11, 2019

Related U.S. Application Data

(60) Provisional application No. 62/614,031, filed on Jan. 5, 2018.

(51) Int. Cl.
*B65D 19/38* (2006.01)
*F16M 11/38* (2006.01)

(52) U.S. Cl.
CPC .......... *B65D 19/385* (2013.01); *F16M 11/38* (2013.01)

(58) Field of Classification Search
CPC ..... A47B 3/002; A47B 3/08; A47B 2003/025; A47B 2003/0821; B65D 19/385; F16M 11/38
See application file for complete search history.

(56) References Cited

U.S. PATENT DOCUMENTS

| | | | |
|---|---|---|---|
| 1,901,732 A | 3/1933 | Clark | |
| 2,466,205 A | 4/1949 | Burr | |
| 2,540,849 A | 2/1951 | Walker | |
| 2,558,915 A | 7/1951 | Sheffer | |
| 2,690,369 A | 9/1954 | Laskey et al. | |
| 2,838,353 A | 6/1958 | Emmert | |
| 5,217,125 A * | 6/1993 | Swanson | A47B 3/08 108/132 |
| 6,428,242 B1 | 8/2002 | Ward | |
| 6,732,663 B2 | 5/2004 | Tsai | |
| 6,976,438 B2 | 12/2005 | Lou-Hao | |

(Continued)

OTHER PUBLICATIONS

S-Line Catalog, "Van Trailer Products / 600-STD13 Pallet Deck", p. 29.

*Primary Examiner* — Daniel J Rohrhoff
(74) *Attorney, Agent, or Firm* — Brinks Gilson & Lione (57) ABSTRACT

A foldable pallet deck is provided. The foldable pallet deck comprises first and second base members connected by a frame member, first and second legs selectively movable with respect to the first base member, third and fourth legs selectively movable with respect to the second base member; first, second, third, and fourth connecting plate assemblies connecting the first, second, third, and fourth legs with the first and second base members such that each of the first, second, third, and fourth legs are movable with respect to the respective first and second base members between a deployed configuration and a folded configuration, first and second cross members configured to securely engage first and second stacking members, respectively, when the pallet deck is in the deployed configuration.

28 Claims, 12 Drawing Sheets

(56) References Cited

U.S. PATENT DOCUMENTS

| | | | |
|---|---|---|---|
| 7,503,267 B1* | 3/2009 | Zemel | A47B 3/08 |
| | | | 108/115 |
| 8,683,929 B2 | 4/2014 | Peery et al. | |
| 9,345,317 B2 | 5/2016 | Chang | |
| 9,357,842 B2* | 6/2016 | Gu | A47B 85/06 |
| 2005/0052058 A1 | 3/2005 | Nyo et al. | |
| 2009/0165771 A1 | 7/2009 | Selk | |
| 2018/0085912 A1* | 3/2018 | Cindric | B25H 1/04 |
| 2018/0333838 A1* | 11/2018 | Cindric | B25H 1/04 |

* cited by examiner

FOLDABLE PALLET DECK

CROSS-REFERENCE TO RELATED APPLICATIONS

This application claims priority to U.S. Provisional Application No. 62/614,031, filed Jan. 5, 2018, the entirety of which is hereby fully incorporated by reference herein.

TECHNICAL FIELD

The subject specification relates to interior van logistic solutions. More specifically, it relates to a foldable pallet deck with self-deployable folding leg assembly for use in freight trailers.

BACKGROUND

Pallet decks with legs have been used in the freight industry to maximize the space utilization in cargo vans, trucks, and freight trailers, and to minimize damage to cargo or products being transported. Some conventional pallet decks are provided with fixed (i.e. non-foldable) legs, thus taking unnecessary extra space when not in use. To remedy this problem, one previous improvement was to replace the fixed legs with foldable legs that are connected to the deck frame by a separate pin. However, such separate pins can be easily lost or damaged and have to be manually inserted or removed when deploying or folding the legs. Thus, such a design requires extra steps to be performed by users during operation, which reduce efficiency or render pallet decks to be inoperable in the field. Moreover, the pallet decks with foldable legs currently on the market do not nest when stacked together in a folded configuration, causing additional concerns of injuring users and damaging products (and/or vehicles) during transportation.

BRIEF SUMMARY

A first representative embodiment of the disclosure is provided. The embodiment includes a foldable leg assembly. The foldable leg assembly comprises a base member having a first end, a second end, and a middle portion disposed between the first and second ends; a leg having a first end, a second end, and a middle portion disposed between the first and second ends; a connecting plate assembly comprising a first connecting plate provided at the first end of the base member, wherein a slot is defined on the first connecting plate for movably receiving a connecting pin that extends from a first end of the leg, wherein the connecting pin movably and pivotally connects the first end of the leg with the connecting plate assembly such that the leg is movable with respect to the base member between a deployed configuration and a folded configuration; a cross member rigidly mounted to the leg and extending perpendicularly from the leg; a stacking member connected to and running parallel to the base member, wherein the stacking member and the cross member are configured to securely engage each other when the leg is in the deployed configuration such that the movement of the cross member in a direction perpendicular to a plane defined by the base member and the stacking member is restricted.

Another representative embodiment of the disclosure is provided. The embodiment includes a foldable pallet deck. The foldable pallet deck comprises first and second base members running parallel with each other and each having a first end, a second end, and a middle portion disposed between the first and second ends, wherein the first and second base members are connected by a frame member; first, second, third, and fourth legs each having a first end, a second end, and a middle portion disposed between the first and second ends, wherein the first and second legs run parallel with each other and are rigidly fixed together and the third and fourth legs run parallel with each other and are rigidly fixed together, wherein the first and second legs are selectively movable with respect to the first base member and the third and fourth legs are selectively movable with respect to the second base member; wherein each of the first and second ends of the first and second base members comprise a connecting plate assembly having a first connect plate, wherein a slot is defined on each of the first connecting plates for movably receiving a connecting pin that extends from one of the first, second, third, and fourth legs, wherein each respective connecting pin movably and pivotally connects the first end of the respective leg with the respective first connecting plate such that each of the first, second, third, and fourth legs are movable with respect to the respective first and second base members between a deployed configuration and a folded configuration; a first cross member spanning between and perpendicular to each of the first and second legs, a second cross member spanning between and extending perpendicular to each of the third and fourth legs; first and second stacking members running parallel to the first and second base members, wherein the first stacking member and the first cross member are configured to securely engage each other when the first and second legs are in the deployed configuration such that the movement of the first cross member in a direction perpendicular to a first plane defined by the first base member and the first stacking member is restricted, and the second stacking member and the second cross member are configured to securely engage each other when the third and fourth legs are in the deployed configuration such that the movement of the second cross member in a direction perpendicular to a second plane defined by the second base member and the second stacking member is restricted.

Another representative embodiment of the disclosure is provided. The embodiment includes a stackable pallet deck system. This system comprises first and second foldable pallet decks each comprising: first and second base members running parallel with each other and each having a first end, a second end, and a middle portion disposed between the first and second ends, wherein the first and second base members are connected by a frame member; first, second, third, and fourth legs each having a first end, a second end, and a middle portion disposed between the first and second ends, wherein the first and second legs run parallel with each other and the third and fourth legs run parallel with each other; wherein each of the first and second ends of the first and second base members comprise a connecting plate assembly having a first connecting plate, wherein a slot is defined on each of the first connecting plates for movably receiving a connecting pin that extends from one of the first, second, third, and fourth legs, wherein each respective connecting pin movably and pivotally connects the first end of the respective leg with the respective first connecting plates such that the respective leg is movable with respect to the frame member between a deployed configuration and a folded configuration; a first cross member spanning between and perpendicular to the first and second legs, a second cross member spanning between and perpendicular to the third and fourth legs; first and second stacking members running parallel to the first and second base members, wherein the first stacking member and the first cross member are configured to securely engage each other when the first and second legs are in the deployed configuration such that the movement of the first cross member in a direction perpendicular to a first plane defined by the first base member and the first stacking member is restricted, and the second stacking member and the second cross member are configured to securely engage each other when the third and fourth legs are in the deployed configuration such that the movement of the second cross member in a direction perpendicular to a second plane defined by the second base member and the second stacking member is restricted; wherein the first stacking member of the first foldable pallet deck is further configured to securely receive the first base member and the frame member of the second foldable pallet deck, and the second stacking member of the first foldable pallet deck is further configured to securely receive the second base member and the frame member of the second foldable pallet deck, such that when the first, second, third, and fourth legs of the first foldable pallet deck are disposed in the folded configuration the first foldable pallet deck can be securely stacked upon the second foldable pallet deck.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
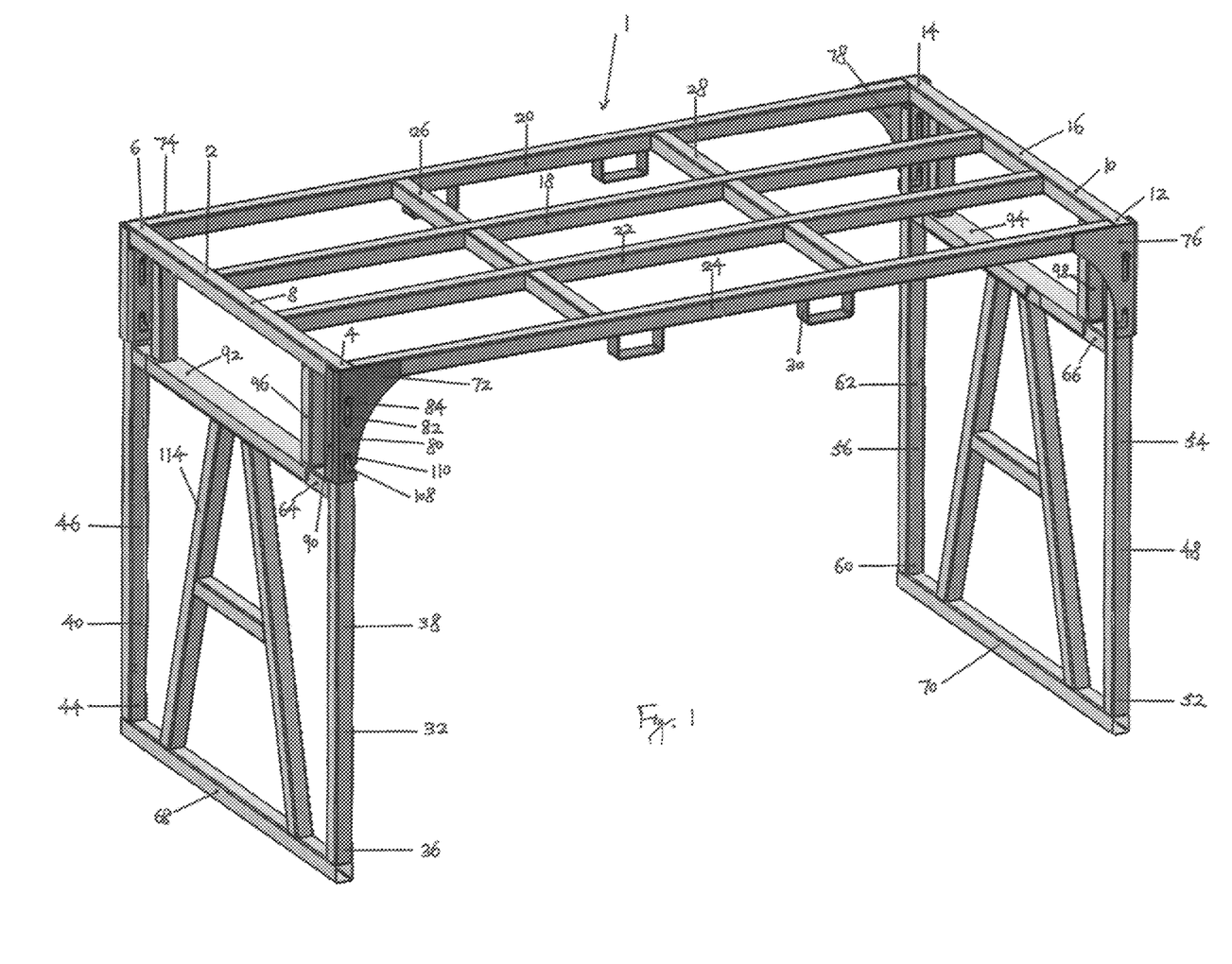
FIG. 1 is a perspective view of an example of a pallet deck with self-deployable folding leg assembly according to the present disclosure in a deployed configuration.

Turning now to FIG. 1, a foldable pallet deck (1) with self-deployable folding leg assembly is provided. The pallet deck comprises first and second base members (2, 10) running parallel with each other and each having a first end (4, 12), a second end (6, 14), and a middle portion (8, 16) disposed between the first and second ends. The first and second base members (2, 10) are connected by a frame member (18). In some embodiments, the first and second base members (2, 10) are connected by one or more additional frame members (20, 22, 24). In some embodiments, at least one of the frame members (18, 20, 22, 24) further comprises a lifting ring (30) configured for receiving a fork of a forklift (not shown). In some embodiments, the pallet deck further comprises at least one frame strengthening bar (26).

Still referring to FIG. 1, the foldable pallet deck further comprises first, second, third, and fourth legs (32, 40, 48, 56) each having a first end (34, 42, 50, 58 in FIG. 7), a second end (36, 44, 52, 60), and a middle portion (38, 46, 54, 62) disposed between the first and second ends. The first and second legs (32, 40) run parallel with each other and are rigidly fixed together and the third and fourth legs (48, 56) run parallel with each other and are rigidly fixed together. In some embodiments, the first and second legs (32, 40) are rigidly fixed together by a first cross member (64) which spans between and is perpendicular to each of the first and second legs (32, 40), and the third and fourth legs (48, 56) are rigidly fixed together by a second cross member (66) which spans between and is perpendicular to each of the third and fourth legs (48, 56). In some embodiments, the first and second legs (32, 40) are rigidly fixed together by a first ground member (68) which spans between and is perpendicular to each of the first and second legs (32, 40), and the third and fourth legs (48, 56) are rigidly fixed together by a second ground member (70) which spans between and is perpendicular to each of the third and fourth legs (48, 56). In some embodiments, the first and second legs (32, 40) are rigidly fixed together by both the first cross member (64) and the first ground member (68), and the third and fourth legs (48, 56) are rigidly fixed together by both the second cross member (66) and the second ground member (70). In some embodiments, the first and second legs (32, 40) are selectively movable with respect to the first base member (2) and the third and fourth legs (48, 56) are selectively movable with respect to the second base member (10).

Figure 2:
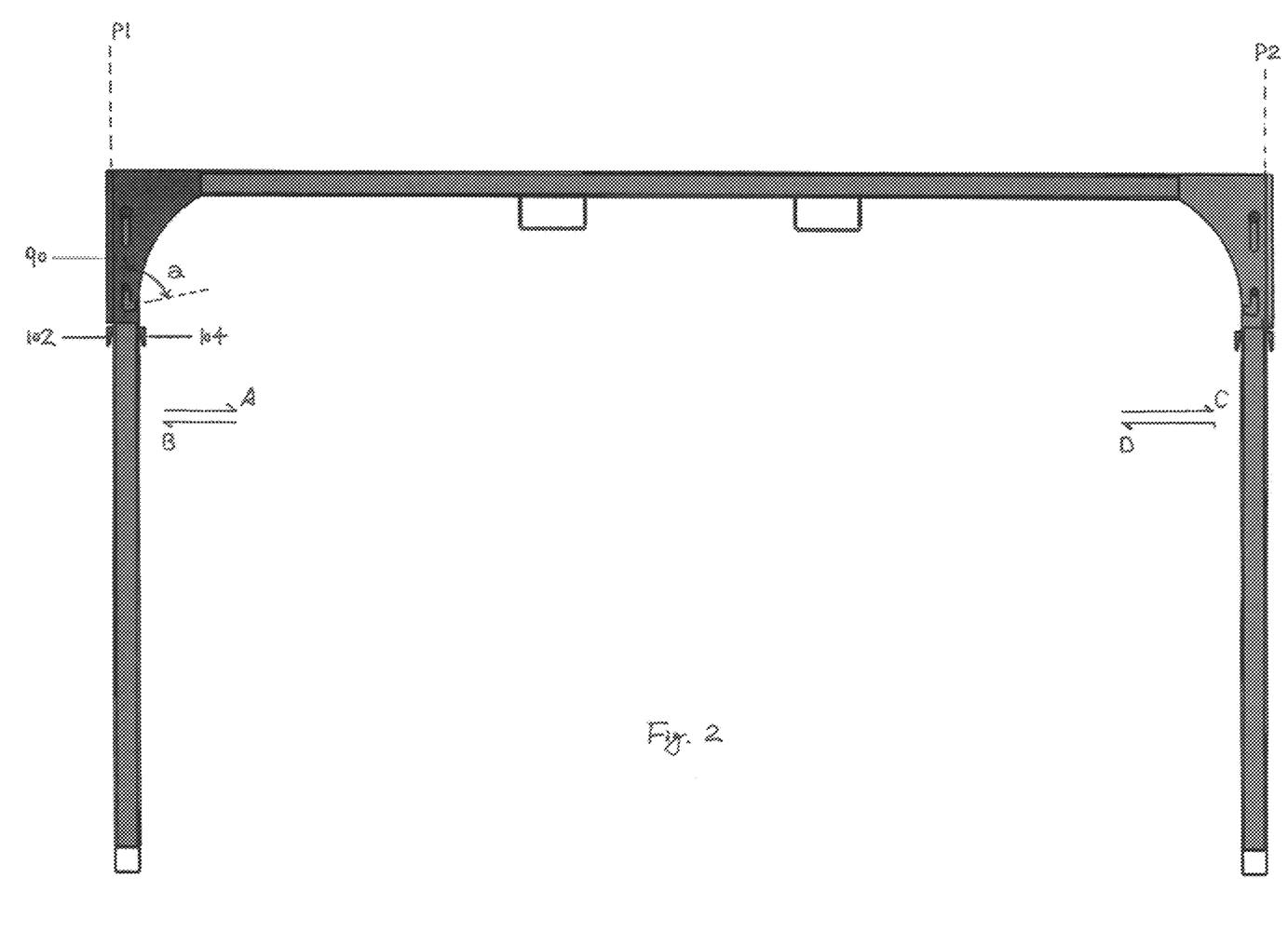
FIG. 2 is a front view of the pallet deck with self-deployable folding leg assembly shown in FIG. 1 in the deployed configuration.
Figure 3:
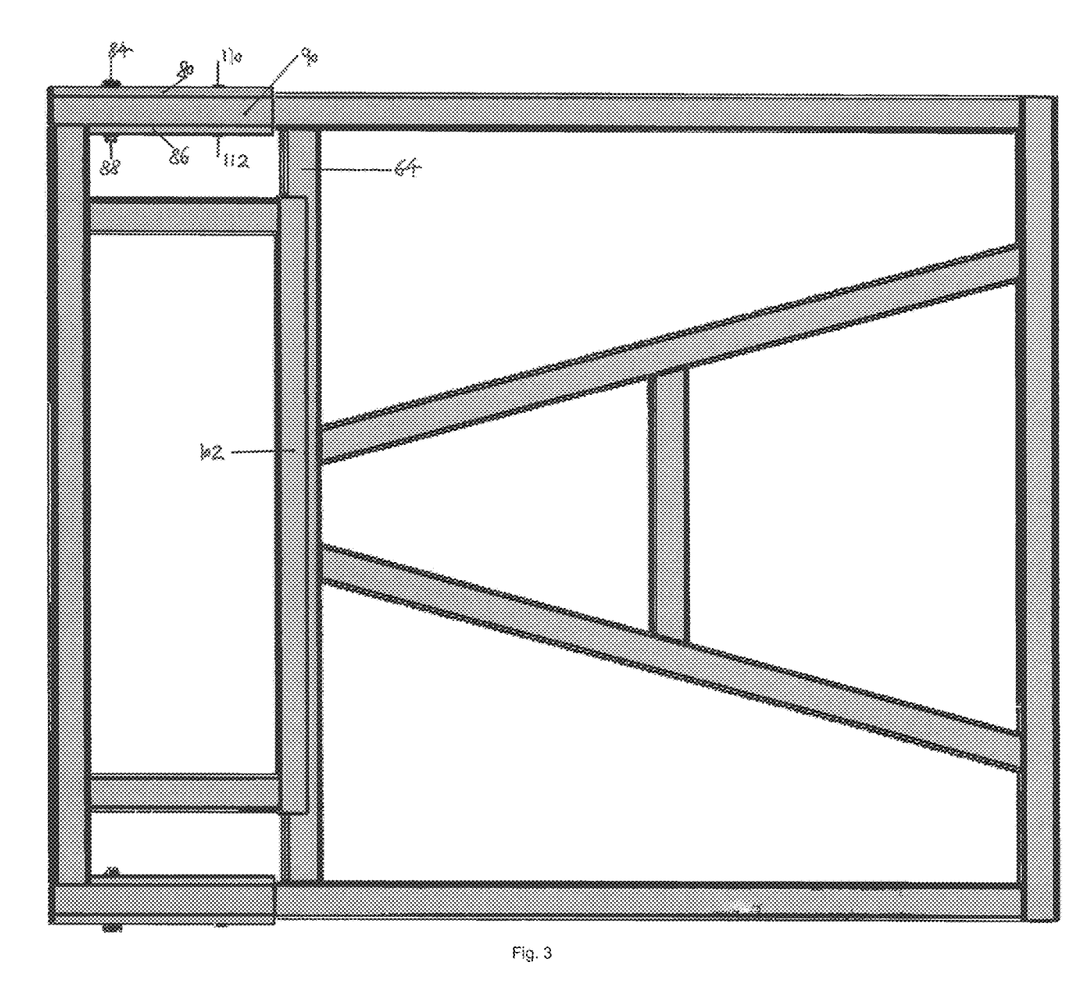
FIG. 3 is a side view of the pallet deck with self-deployable folding leg assembly shown in FIG. 1 in the deployed configuration.
Figure 4:
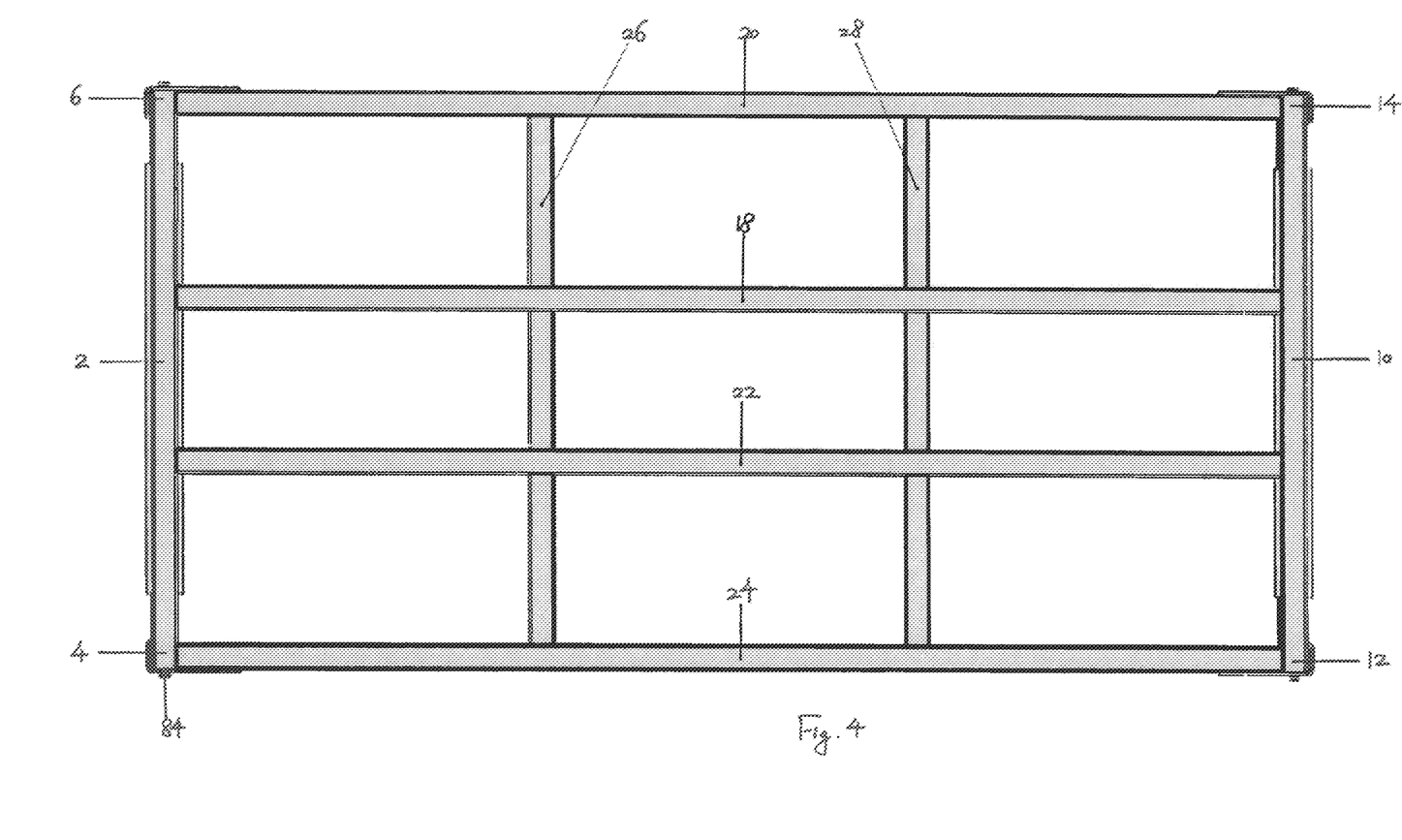
FIG. 4 is a top view of the pallet deck with self-deployable folding leg assembly shown in FIG. 1 in the deployed configuration.
Figure 7:
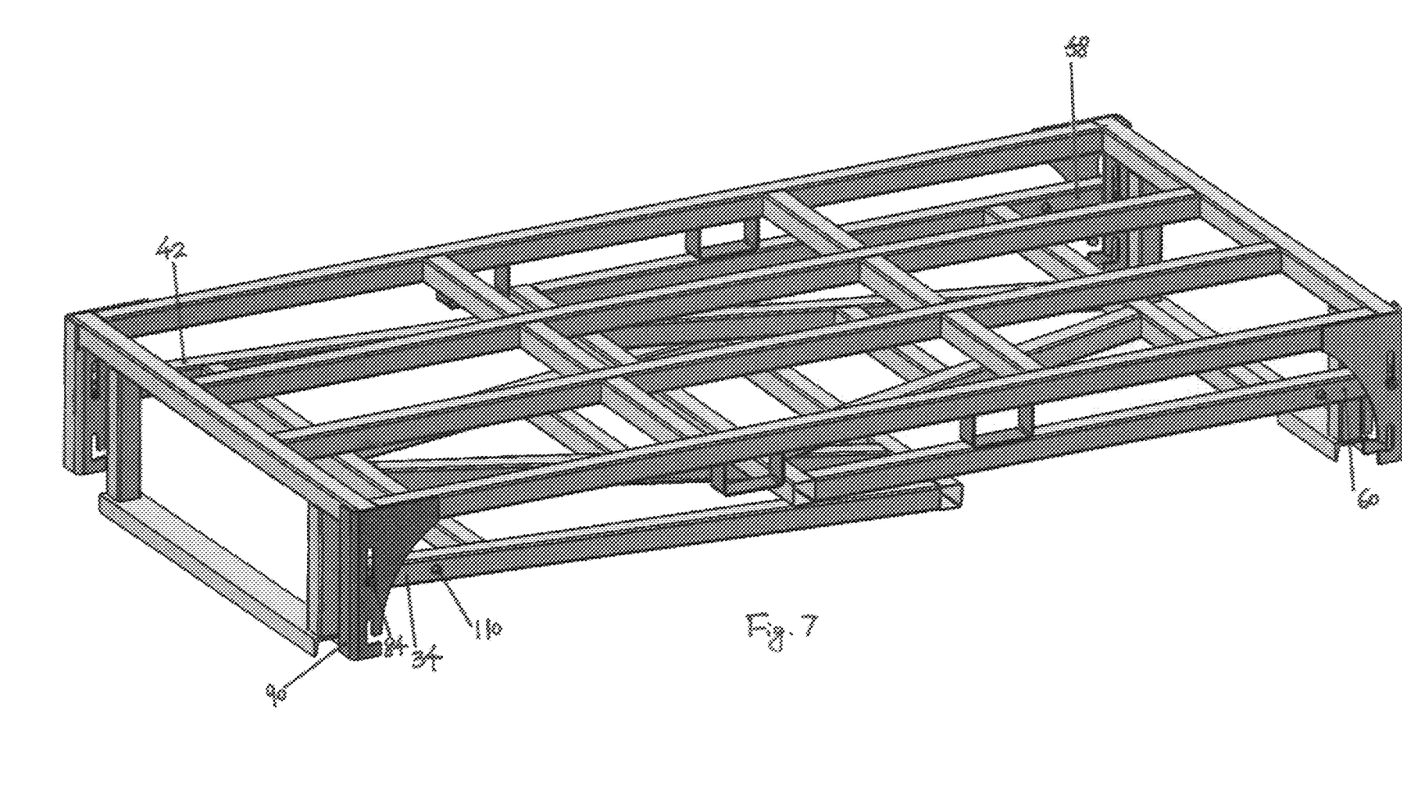
FIG. 7 is a perspective view of the pallet deck with self-deployable folding leg assembly shown in FIG. 1 in a folded configuration.

Still referring to FIG. 1, each of the first and second ends of the first and second base members (2, 10) comprise a connecting plate assembly (72, 74, 76, 78) for connecting the first and second base members (2, 10) with the respective first, second, third, and fourth legs (32, 40, 48, 56). In the preferred embodiments, the pallet deck is of a symmetric design. Thus, the connection between the first end (4) of the first base member (2) and the first end (34 shown in FIG. 7) of the first leg (32) is hereby described as an example. The connecting plate assembly (72) comprises a first connecting plate (80), which defines a first slot (82) for movably and slidably receiving a first connecting pin (84, also shown in FIG. 3) that extends from the first leg (32). In some embodiments, the first slot (82) is defined in a vertical direction. The first connecting pin (84) movably and pivotally connects the first end (34 shown in FIG. 7) of the first leg (32) with the first connecting plate (80) such that the first leg (32) is movable with respect to the first base member (2) between a deployed configuration (FIG. 1) and a folded configuration (FIG. 7). In some embodiments, the first connecting pin (84) is a separate component placed in a through hole defined on the first leg (32). In some embodiments, the first connecting pin (84) is integrally formed on the first leg (32). In some embodiments, the first connecting plate (80) further defines a second slot (108, see also FIG. 2) for removably and slidably receiving a releasable pin (110, see also FIGS. 3 & 7) that extends from the first end (34 in FIG. 7) of the first leg (32). In some embodiments, the second slot (108) is L-shaped and comprises a vertical portion (108*a* in FIG. 2) and a side recess (108*b* in FIG. 2) together defining an angle α (FIG. 2). In some embodiments, the first slot (82) and the vertical portion (108*b*) of the second slot are aligned. Although in the preferred embodiments the angle α is an acute angle (such as between 89-70 degrees), it is contemplated that α may also be a right or obtuse angle. The first slot (82) and the vertical portion (108*a*) of the second slot (108) together restrict the movement of the first connecting pin (84) and the first releasable pin (110), thus restricting the movement of the first leg (32) in the deployed configuration in directions A and B perpendicular to a plane P1 (FIG. 2) defined by the first base member (2) and the first stacking member (92). In some embodiments, the first releasable pin (110) is a separate component placed in a through hole defined on the first leg (32). In some embodiments, the first releasable pin (110) is integrally formed on the first leg (32).

Figure 10:
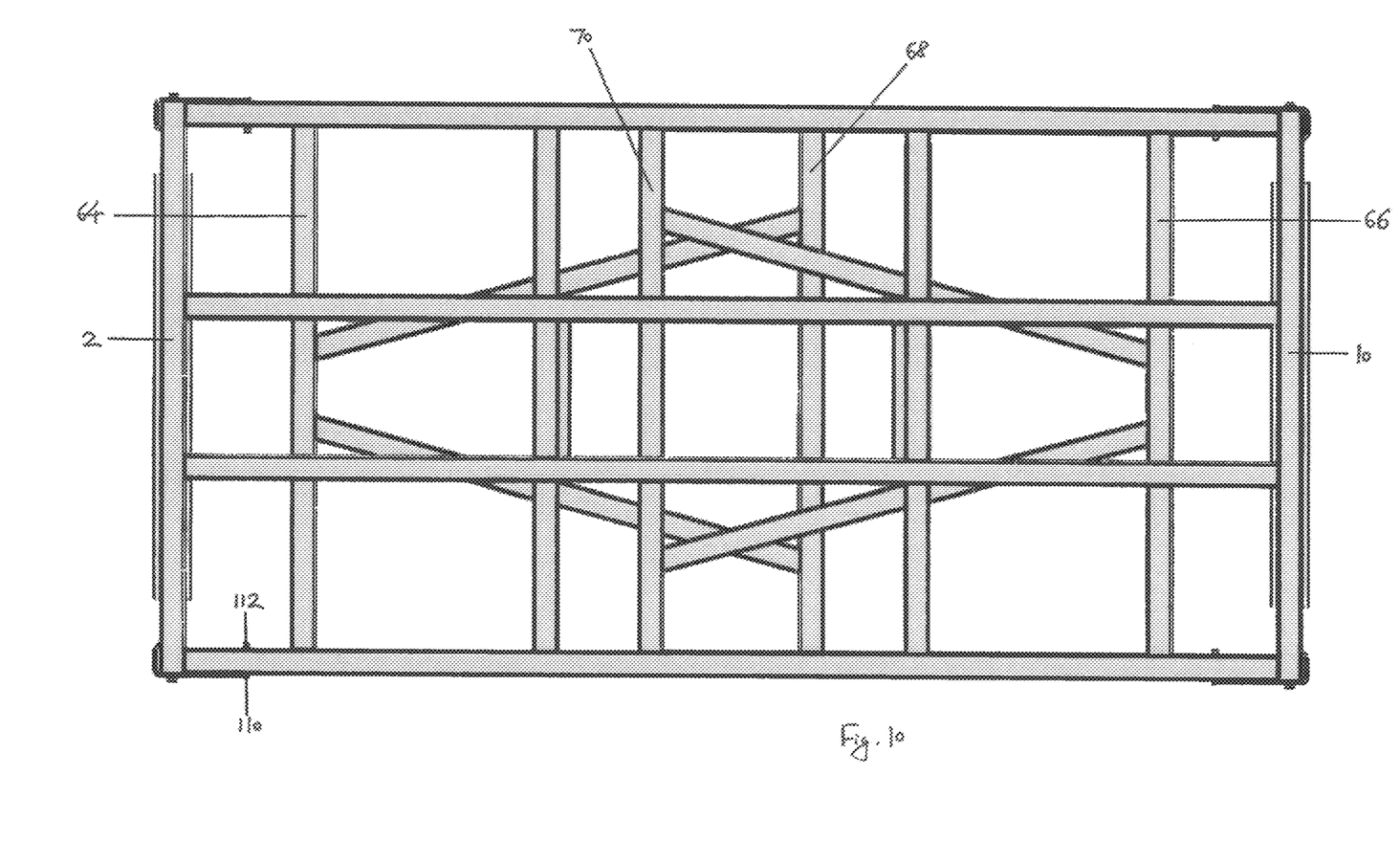
FIG. 10 is a top view of the pallet deck with self-deployable folding leg assembly shown in FIG. 7 in the folded configuration.

In some embodiments, the connecting plate assembly (72) further comprises a second connecting plate (86 in FIG. 12) disposed in parallel to the first connecting plate (80). In some embodiments, the second connecting plate (86 in FIG. 12) defines slots mimicking the slots defined on the first connecting plate (80), although it is contemplated that the second connecting plate (86) may define only a single slot mimicking one of the slots defined on the first connecting plate (80). The couple of slots defined on the second connecting plate (86) movably and slidably receives a second connecting pin (88 in FIG. 3) and a second releasable pin (112 in FIGS. 3 & 10), respectively, both of which extend from the first end of the first leg (32). The first and second connecting pins (84, 88 in FIG. 3) on the first leg (32) movably and pivotally connect the first end (34 in FIG. 7) of the first leg (32) with the connecting plate assembly (72) such that the first leg (32) is movable with respect to the first base member (2) between a deployed configuration (FIG. 1) and a folded configuration (FIG. 7). The slots on the second connecting plate (86) together restrict the movement of the second connecting pin (88) and the second releasable pin (112), thus restricting the movement of the first leg (32) in the deployed configuration in directions A and B perpendicular to a plane P1 (FIG. 2) defined by the first base member (2) and the first stacking member (92). In some embodiments, the first and second connecting pins (84, 88) are formed as one component and placed in a through hole defined on the first leg (32). In some embodiments, the first and second connecting pins (84, 88) are two separate structures integrally formed on the first leg (32). In some embodiments, the first and second releasable pins (110, 112 in FIGS. 3 & 10) are formed as one component and placed in a through hole defined on the first leg (32). In some embodiments, the first and second releasable pins (110, 112) are two separate structures integrally formed on the first leg (32).

Figure 8:
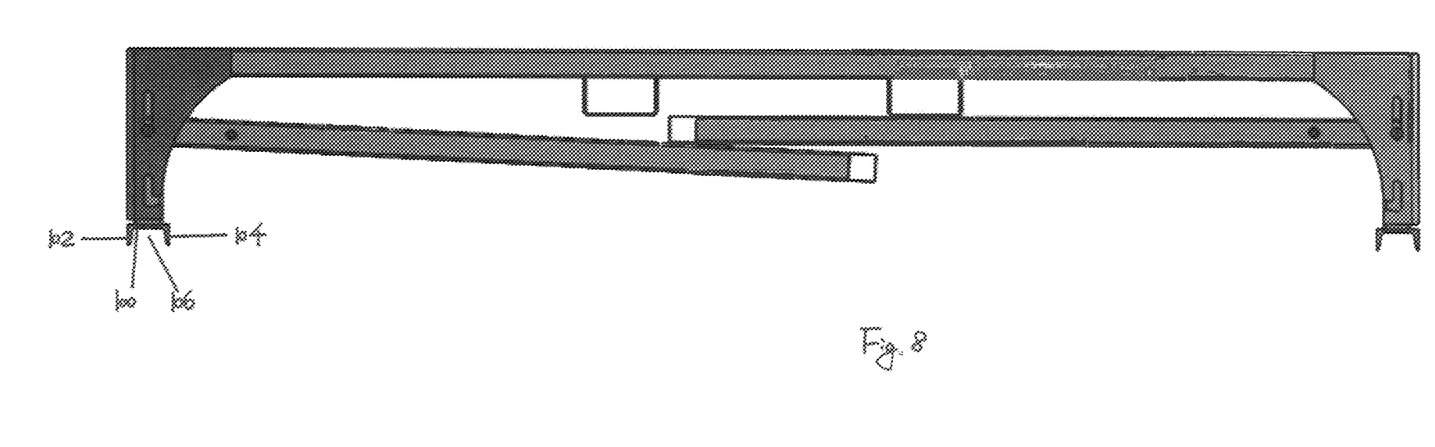
FIG. 8 is a front view of the pallet deck with self-deployable folding leg assembly shown in FIG. 7 in the folded configuration.
Figure 9:
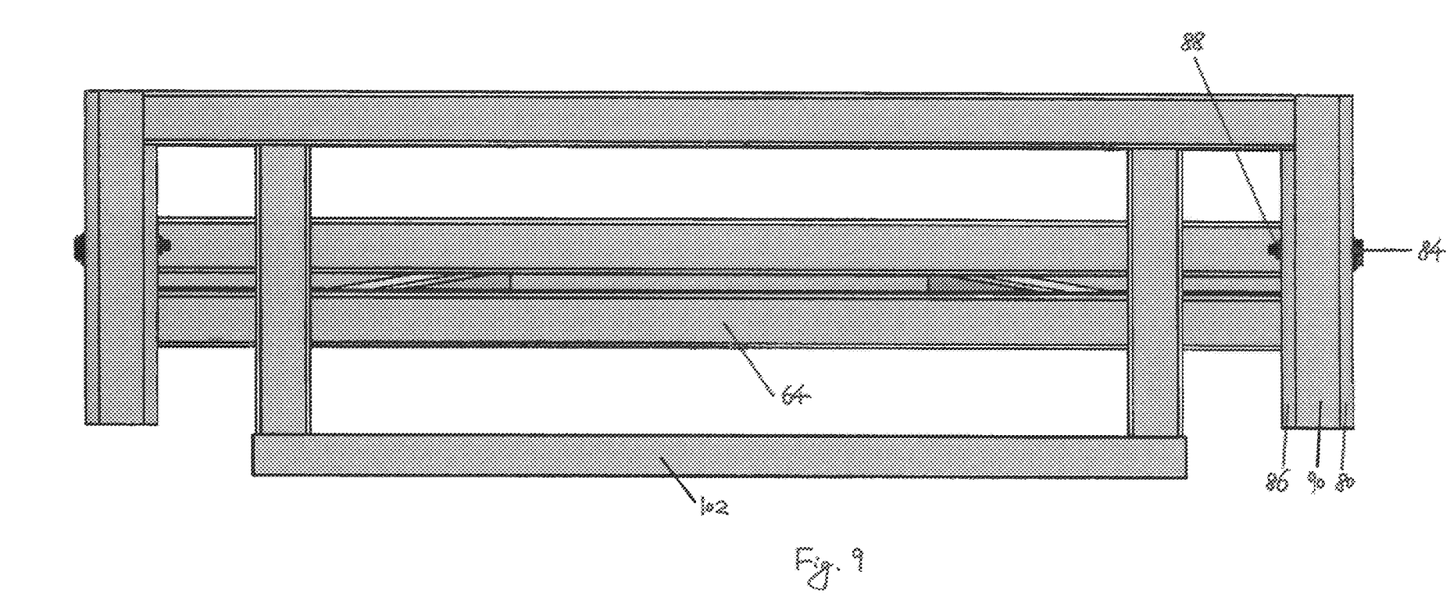
FIG. 9 is a side view of the pallet deck with self-deployable folding leg assembly shown in FIG. 7 in the folded configuration.

Referring to FIGS. 1 and 2, the foldable pallet deck further comprises first and second stacking members (92, 94) running parallel to the first and second base members (2, 10). Although in the preferred embodiments the first stacking member (92) is connected to the first base member (2) by at least one hanging bar (96) and the second stacking member (94) is connected to the second base member (10) by at least one hanging bar (98), it is also contemplated that in some embodiments the hanging bars (96, 98) are not necessary as the first stacking member (92) is connected to the first base members (2) by at least one of the first and second connecting plate assemblies (72, 74) and the second stacking member (94) connected to the second base members (10) by at least one of the third and fourth connecting plate assemblies (76, 78). The first stacking member (92) and the first cross member (64) are configured to securely engage each other when the first and second legs (32, 40) are in the deployed configuration such that the movement of the first cross member (64) in directions A and B. In some embodiments, the directions A and B are perpendicular to a plane P1 (FIG. 2) defined by the first base member (2) and the first stacking member (92) is restricted. The second stacking member (94) and the second cross member (66) are configured to securely engage each other when the third and fourth legs (48, 56) are in the deployed configuration such that the movement of the second cross member (66) in directions C and D. In some embodiments, the directions C and D are perpendicular to a plane P2 (FIG. 2) defined by the second base member (10) and the second stacking member (94) is restricted. In some embodiments, the first stacking member (92) comprises a first side wall (102 in FIGS. 2, 8 & 12), a top wall (100 in FIG. 8), and a second side wall (104 in FIGS. 2, 8 & 12) together defining a partially enclosed volume (106 in FIG. 8) such that the first stacking member (92) and the first cross member (64) are configured to securely engage each other with the first cross member (64) disposed within the partially enclosed volume (106) when the first and second legs (32, 40) are in the deployed configuration. The first and second side walls (102, 104) restrict the movement of the first cross member (64) in the deployed configuration in directions A and B.

Still referring to FIG. 1, in some embodiments, the connecting plate assembly (72) further comprises a leg stopping plate (90, see also FIGS. 2, 3 & 7) which restricts the movement of the first leg (32) in the deployed configuration in the direction B. In such embodiments, the first side wall (102 in FIG. 2) of the first stacking member (92) need not be provided. In some embodiments, the leg stopping plate (90) is disposed between the first and second connecting plates (80, 86 in FIGS. 3 & 12). In some embodiments, the first and second connecting plates (80, 86) and the leg stopping plate (90) of the connecting plate assembly (72) are integrally formed as one component.

Figure 12:
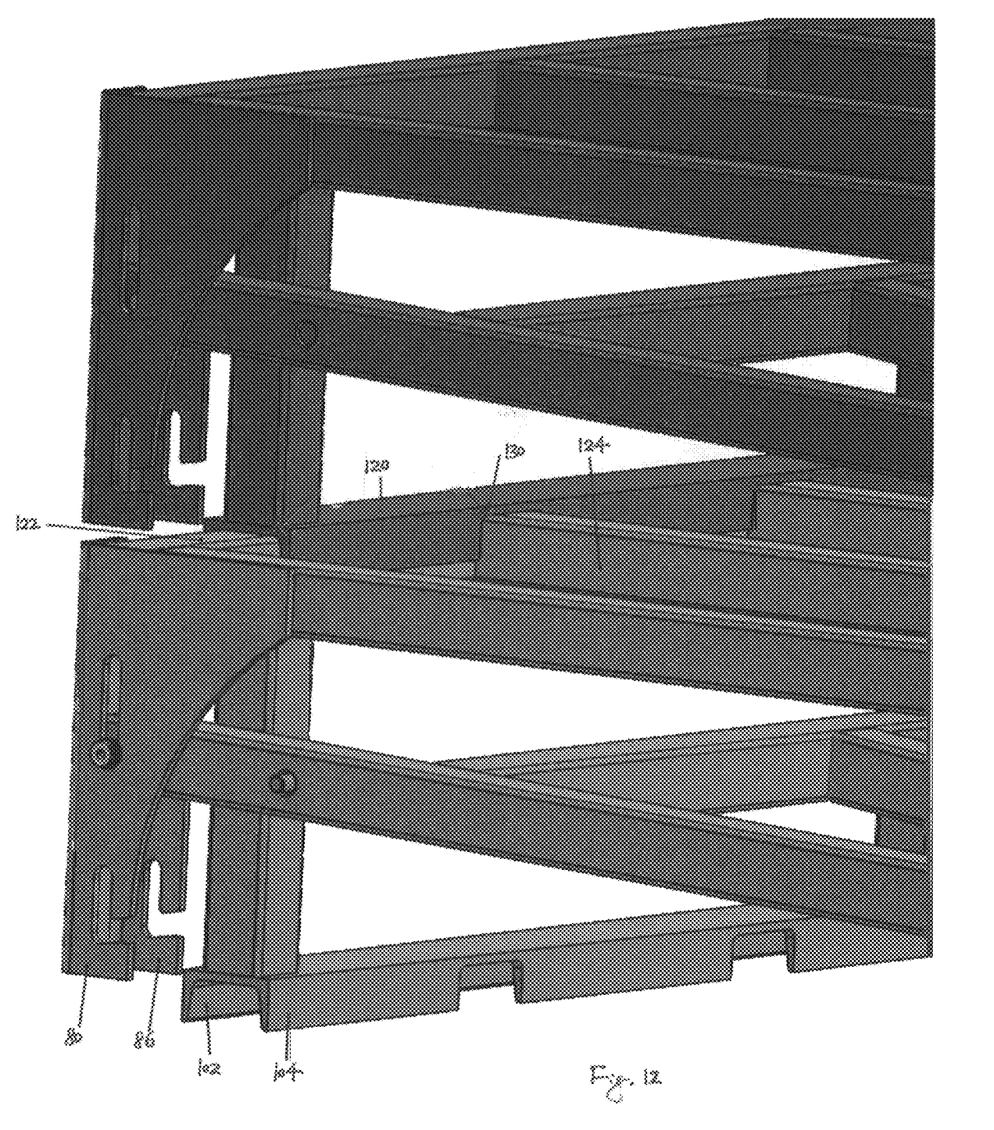
FIG. 12 is an enlarged local perspective view of the stackable pallet deck system shown in FIG. 11 in the stacked configuration.

In some embodiments, the movement of the first leg (32) in the deployed configuration in a direction perpendicular to a plane P1 (FIG. 2) defined by the first base member (2) and the first stacking member (92) is restricted by at least one of [1] the side walls (102, 104 in FIG. 2) of the first stacking member (92), [2] the leg stopping plate (90), and [3] the slots defined on at least one of the first and second connecting plates (80, 86 in FIG. 12).

Figure 5:
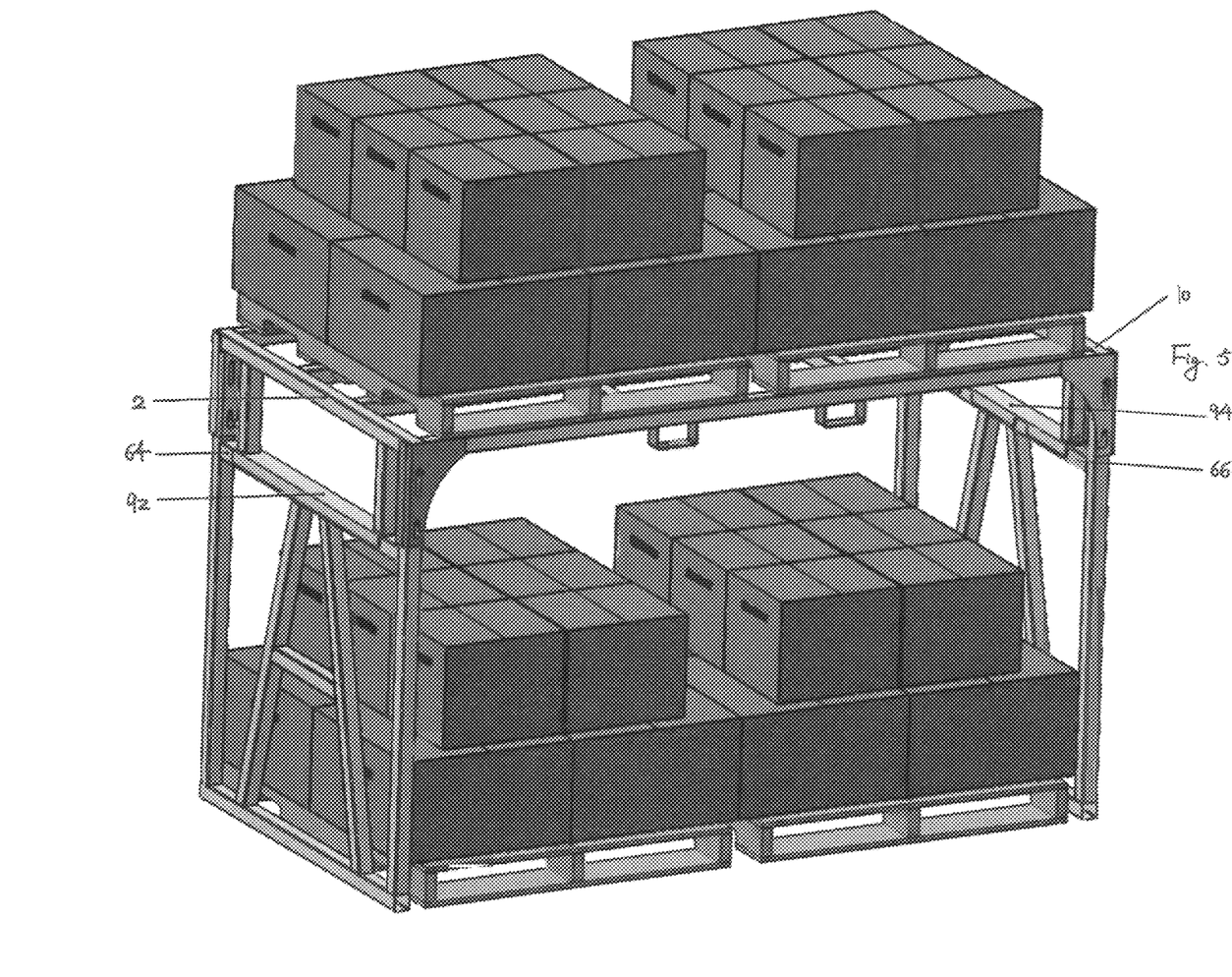
FIG. 5 is a perspective view of the pallet deck with self-deployable folding leg assembly shown in FIG. 1 in a fully loaded condition.
Figure 6:
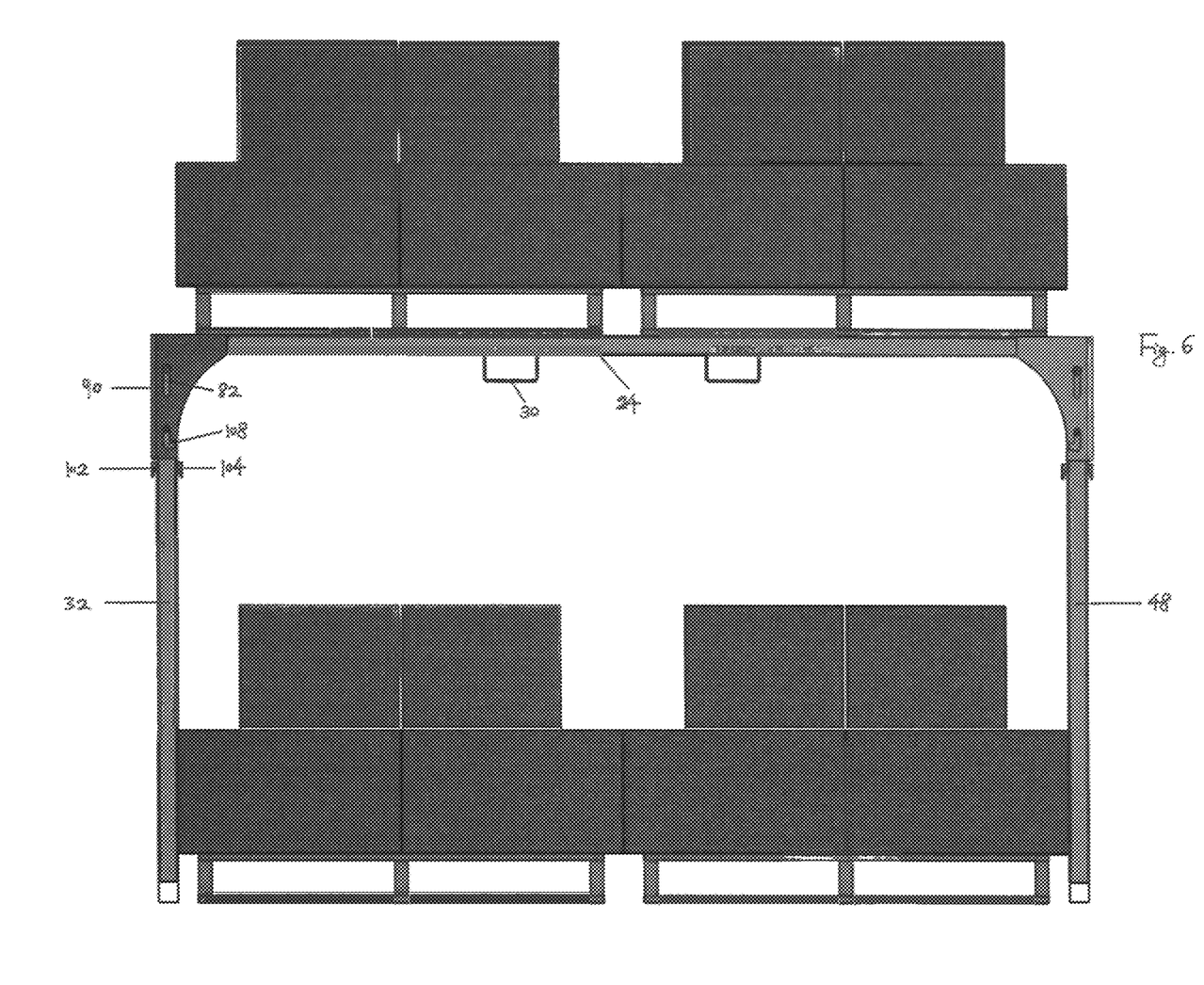
FIG. 6 is a front view of the pallet deck with self-deployable folding leg assembly shown in FIG. 5 in the fully loaded condition.

Referring to FIGS. 1 and 5, although in the preferred embodiments the first cross member (64) is total weight-bearing, meaning that the weight of the goods placed on top of the pallet deck is passed onto the first cross member (64) via its engagement with the first stacking member (92) in the deployed configuration, it is also contemplated that the first cross member (64) may be semi-weight-bearing or non-weight-bearing with some or all of the weight instead being bore by the first end (34 in FIG. 7) of the first leg (32) and/or the pins that extend from the first leg (32) engaging the connecting plate assembly (72). In some embodiments, to reduce the risk of deforming or damaging the pins that extend from the first leg (32) due to excessive force/weight, it is preferable to configure the position and dimension of the slots defined on the connecting plate assembly (72), the position of the pins that extend from the first leg (32), and/or the position and dimension of the first end (34 in FIG. 7) of the first leg (32) such that the first end (34) of the first leg (32) engages the first end (4) of the first base member (2) in the deployed configuration without the pins contacting the top ends of the slots.

Still referring to FIG. 1, the foldable pallet deck further comprises an A-shaped reinforcement assembly (114), although it is contemplated that the reinforcement assembly may also be the conventional X-shape or any other design that increases the lateral stiffness of the first and second legs (32, 40).

Figure 11:
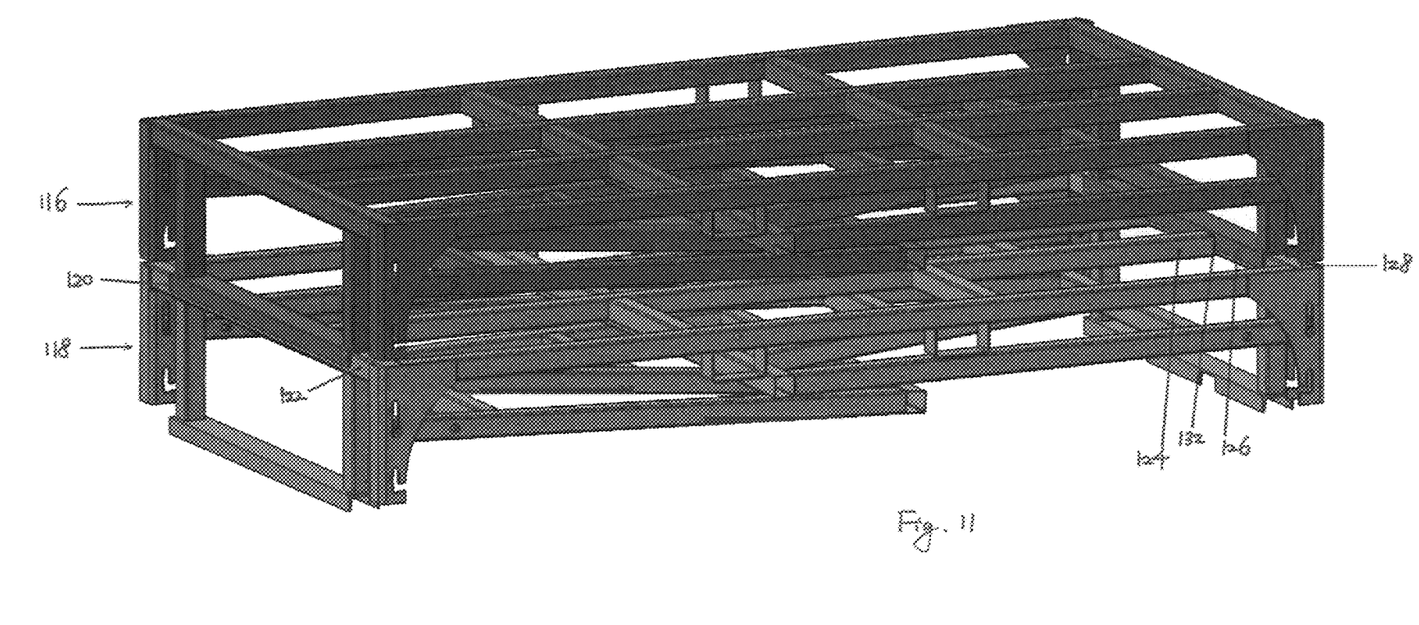
FIG. 11 is a perspective view of an example of a stackable pallet deck system according to the present disclosure in a stacked configuration.

Referring to FIGS. 11 and 12, a stackable pallet deck system is provided. The system comprises first and second foldable pallet decks (116, 118) with self-deployable folding leg assembly according to the present disclosure. The first stacking member (120) of the first foldable pallet deck (116) is further configured to securely receive the first base member (122) and a frame member (124) of the second foldable pallet deck (118), and the second stacking member (126) of the first foldable pallet deck (116) is further configured to securely receive the second base member (128) and the frame member (124) of the second foldable pallet deck (118), such that when the first, second, third, and fourth legs of the first foldable pallet deck (116) are disposed in the folded configuration the first foldable pallet deck (116) can be securely stacked and nested upon the second foldable pallet deck (118). In some embodiments, the first and second stacking members (120, 126) of the first foldable pallet deck (116) each comprise a recess (130, 132) for securely receiving the frame member (124) of the second foldable pallet deck (118).

Referring to FIGS. 1 and 7, a method of automatically unfolding a foldable pallet deck is provided. To move the foldable pallet deck (1) from the folded configuration (FIG. 7) to the deployed configuration (FIG. 1), the user first lifts the foldable pallet deck (1), preferably using a forklift with the forks inserted through the lifting rings (30). As the foldable pallet deck (1) is being lifted off the ground (or from another pallet deck if previously placed in a stacked configuration (FIG. 11)), the first connecting pin (84) slides to the bottom of the first slot (82) with the first leg (32) pivots around the first connecting pin (84) towards the deployed position, causing the first releasable pin (110) to enter the side recess (108b) of the L-shaped second slot (108). When the first releasable pin (110) reaches the joining point of the vertical portion (108a) and the side recess (108b), the first leg (32) is preferably placed in the vertical position. The user then lowers the foldable pallet deck (1) until the first leg (32) rests on a surface. Further lowering the foldable pallet deck thereafter causes the first connecting pin (84) and the first releasable pin (110) to slide upwardly within the first slot (82) and the vertical portion (108b) of the second slot (108), respectively. In the preferred embodiments, the foldable pallet deck (1) is fully deployed when the first stacking member (92) securely engages the first cross member (64). In embodiments where the angle α (FIG. 2) is an acute angle, the side recess (108b) facilitates the first releasable pin (110) in reaching the joining point and prevents unintended disengagement between the first releasable pin (110) and the second slot (108). To move the foldable pallet deck (1) from the deployed configuration (FIG. 1) to the folded configuration (FIG. 7), the user lifts the foldable pallet deck (1) to cause the first connecting pin (80) and the first releasable pin (110) to slide downwardly within the first slot (82) and the vertical portion (108b) of the second slot (108), respectively. Once the first releasable pin (110) reaches the joining point of the vertical portion (108a) and the side recess (108b), the user applies a force to disengage the first releasable pin (110) from the second slot (108) and pivot the first leg (32) around the first connecting pin (80) towards the folded configuration. The user then lowers the foldable pallet deck (1) to place it on a surface or securely stack it on another pallet deck.

The designs according to the present disclosure provide at least the following advantages: [1] automatic deployment and lock into the deployed configuration without the need for manually unfolding and locking the legs; [2] no easily lost or damaged pins; [3] stackable design allows for more secured storage and shipment; [4] compact storage allows for better shipping efficiency.

While the preferred embodiments of the disclosed have been described, it should be understood that the invention is not so limited and modifications may be made without departing from the disclosure. For example, it is contemplated that the self-deploying leg assembly according to the present disclosure may also be used outside the freight industry such as on family gaming tables. In addition, although in the preferred embodiments the slots are defined on the connecting plates assembly and the pins extend from the leg, it is contemplated that such an arrangement may be reversed, namely by defining the slots on the legs and placing the pins on the connecting plate assembly. The scope of the disclosure is defined by the appended claims, and all devices that come within the meaning of the claims, either literally or by equivalence, are intended to be embraced therein.

The invention claimed is:

1. A foldable leg assembly, comprising:
    a base member having a first end, a second end, and a middle portion disposed between the first and second ends;
    a leg having a first end, a second end, and a middle portion disposed between the first and second ends;
    a connecting plate assembly comprising a first connecting plate provided at the first end of the base member, wherein a slot is defined on the first connecting plate for movably receiving a connecting pin that extends from the first end of the leg, wherein the connecting pin movably and pivotally connects the first end of the leg with the connecting plate assembly such that the leg is movable with respect to the base member between a deployed configuration and a folded configuration;
    a cross member rigidly mounted to the leg and extending perpendicularly from the leg;
    a stacking member connected to and running parallel to the base member, wherein the stacking member and the cross member are configured to securely engage each other when the leg is in the deployed configuration such that the movement of the cross member in a direction perpendicular to a plane defined by the base member and the stacking member is restricted.

2. The foldable leg assembly of claim 1, wherein the stacking member defines a partially enclosed volume, wherein the stacking member and the cross member are configured to securely engage each other with the cross member disposed within the partially enclosed volume when the leg is in the deployed configuration.

3. The foldable leg assembly of claim 1, wherein the connecting plate assembly further comprises a second connecting plate disposed in parallel to the first connecting plate, wherein the second connecting plate defines a second slot parallel to the slot on the first connecting plate, wherein the second slot movably receives a second connecting pin that extends from the first end of the leg, wherein the first and second connecting pins movably and pivotally connect the first end of the leg with the connecting plate assembly such that the leg is movable with respect to the base member between a deployed configuration and a folded configuration.

4. The foldable leg assembly of claim 3, wherein the connecting plate assembly further comprises a leg stopping plate disposed between the first and second connecting plates, wherein the leg stopping plate restricts the movement of the leg in a direction perpendicular to the plane defined by the base member and the stacking member.

5. The foldable leg assembly of claim 4, wherein the first and second connecting plates and the leg stopping plate are integrally formed as one piece.

6. The foldable leg assembly of claim 1, further comprising a hanging member connecting the stacking member with the base member.

7. The foldable leg assembly of claim 1, wherein the stacking member is connected to the connecting plate assembly.

8. The foldable leg assembly of claim 1, wherein the first connecting plate defines a second slot for removably receiving a releasable pin that extends from the first end of the leg.

9. The foldable leg assembly of claim 8, wherein the second slot is L-shaped and comprises a vertical portion and a side recess, wherein the vertical portion and the recess together define an acute angle.

10. The foldable leg assembly of claim 1, further comprising a reinforcement assembly connected to the cross member.

11. The foldable leg assembly of claim 1, further comprising a ground member rigidly mounted to the leg and extending perpendicularly from the leg.

12. The foldable leg assembly of claim 11, further comprising a reinforcement assembly disposed between the cross member and the ground member.

13. The foldable leg assembly of claim 12, wherein the reinforcement assembly is A-shaped.

14. A foldable pallet deck, comprising:
first and second base members running parallel with each other and each having a first end, a second end, and a middle portion disposed between the first and second ends, wherein the first and second base members are connected by a frame member;
first, second, third, and fourth legs each having a first end, a second end, and a middle portion disposed between the first and second ends, wherein the first and second legs run parallel with each other and are rigidly fixed together and the third and fourth legs run parallel with each other and are rigidly fixed together, wherein the first and second legs are selectively movable with respect to the first base member and the third and fourth legs are selectively movable with respect to the second base member;
wherein each of the first and second ends of the first and second base members comprise a connecting plate assembly having a first connecting plate, wherein a slot is defined on each of the first connecting plates for movably receiving a connecting pin that extends from one of the first, second, third, and fourth legs, wherein each respective connecting pin movably and pivotally connects the first end of the respective leg with the respective first connecting plate such that each of the first, second, third, and fourth legs are movable with respect to the respective first and second base members between a deployed configuration and a folded configuration;
a first cross member spanning between and perpendicular to each of the first and second legs, a second cross member spanning between and extending perpendicular to each of the third and fourth legs;
first and second stacking members running parallel to the first and second base members, wherein the first stacking member and the first cross member are configured to securely engage each other when the first and second legs are in the deployed configuration such that the movement of the first cross member in a direction perpendicular to a first plane defined by the first base member and the first stacking member is restricted, and the second stacking member and the second cross member are configured to securely engage each other when the third and fourth legs are in the deployed configuration such that the movement of the second cross member in a direction perpendicular to a second plane defined by the second base member and the second stacking member is restricted.

15. The foldable pallet deck of claim 14, wherein the first stacking member defines a partially enclosed volume wherein the first stacking member and the first cross member are configured to securely engage each other with the first cross member disposed within the partially enclosed volume when the first and second legs are in the deployed configuration.

16. The foldable pallet deck of claim 14, wherein the connecting plate assembly disposed at the first end of the first base member further comprises a second connecting plate disposed in parallel to the first connecting plate, wherein the second connecting plate defines a second slot parallel to the slot on the first connecting plate, wherein the second slot movably receives a second connecting pin that extends from the first end of the first leg, wherein the first and second connecting pins on the first leg movably and pivotally connect the first end of the first leg with the connecting plate assembly such that the first leg is movable with respect to the first base member between a deployed configuration and a folded configuration.

17. The foldable pallet deck of claim 16, wherein the connecting plate assembly further comprises a leg stopping plate disposed between the first and second connecting plates, wherein the leg stopping plate restricts the movement of the first leg in a direction perpendicular to the plane defined by the first base member and the first stacking member.

18. The foldable pallet deck of claim 17, wherein the first and second connecting plates and the leg stopping plate of the connecting plate assembly are integrally formed as one piece.

19. The foldable pallet deck of claim 14, further comprising a hanging member connecting the first stacking member with the first base member.

20. The foldable pallet deck of claim 14, wherein the first stacking member is connected to the connecting plate assembly disposed at the first end of the first base member.

21. The foldable pallet deck of claim 14, wherein the first connecting plate disposed at the first end of the first base member defines a second slot for removably receiving a releasable pin that extends from the first end of the first leg.

22. The foldable pallet deck of claim 21, wherein the second slot is L-shaped and comprises a vertical portion and a recess, wherein the vertical portion and the recess together define an acute angle.

23. The foldable pallet deck of claim 14, further comprising a reinforcement assembly connected to the first cross member.

24. The foldable pallet deck of claim 14, further comprising a ground member spanning between and perpendicular to each of the first and second legs.

25. The foldable pallet deck of claim 24, further comprising a reinforcement assembly disposed between the first cross member and the ground member.

26. The foldable leg assembly of claim 25, wherein the reinforcement assembly is A-shaped.

27. A stackable pallet deck system, comprising:
first and second foldable pallet decks each comprising: first and second base members running parallel with each other and each having a first end, a second end, and a middle portion disposed between the first and second ends, wherein the first and second base members are connected by a frame member; first, second, third, and fourth legs each having a first end, a second end, and a middle portion disposed between the first and second ends, wherein the first and second legs run parallel with each other and the third and fourth legs run parallel with each other; wherein each of the first and second ends of the first and second base members comprise a connecting plate assembly having a first connecting plate, wherein a slot is defined on each of the first connecting plates for movably receiving a connecting pin that extends from one of the first, second, third, and fourth legs, wherein each respective connecting pin movably and pivotally connects the first end of the respective leg with the respective first connecting plates such that the respective leg is movable with respect to the frame member between a deployed configuration and a folded configuration; a first cross member spanning between and perpendicular to the first and second legs, a second cross member spanning between and perpendicular to the third and fourth legs; first and second stacking members running parallel to the first and second base members, wherein the first stacking member and the first cross member are configured to securely engage each other when the first and second legs are in the deployed configuration such that the movement of the first cross member in a direction perpendicular to a first plane defined by the first base member and the first stacking member is restricted, and the second stacking member and the second cross member are configured to securely engage each other when the third and fourth legs are in the deployed configuration such that the movement of the second cross member in a direction perpendicular to a second plane defined by the second base member and the second stacking member is restricted;
wherein the first stacking member of the first foldable pallet deck is further configured to securely receive the first base member and the frame member of the second foldable pallet deck, and the second stacking member of the first foldable pallet deck is further configured to securely receive the second base member and the frame member of the second foldable pallet deck, such that when the first, second, third, and fourth legs of the first foldable pallet deck are disposed in the folded configuration the first foldable pallet deck can be securely stacked upon the second foldable pallet deck.

28. The stackable pallet deck system of claim 27, wherein the first and second stacking members of the first foldable pallet deck each comprise a recess for securely receiving the frame member of the second foldable pallet deck.

\* \* \* \* \*